United States Patent
Nam et al.

(10) Patent No.: US 11,770,795 B2
(45) Date of Patent: Sep. 26, 2023

(54) PAGING OCCASION SHARING

(71) Applicant: QUALCOMM Incorporated, San Diego, CA (US)

(72) Inventors: Wooseok Nam, San Diego, CA (US); Tao Luo, San Diego, CA (US); Peter Gaal, San Diego, CA (US); Juan Montojo, San Diego, CA (US); Wanshi Chen, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/303,821

(22) Filed: Jun. 8, 2021

(65) Prior Publication Data

US 2021/0385786 A1    Dec. 9, 2021

Related U.S. Application Data

(60) Provisional application No. 63/036,794, filed on Jun. 9, 2020.

(51) Int. Cl.
| | |
|---|---|
| *H04W 68/00* | (2009.01) |
| *H04W 24/08* | (2009.01) |
| *H04W 72/0453* | (2023.01) |
| *H04W 72/0446* | (2023.01) |
| *H04W 72/23* | (2023.01) |

(52) U.S. Cl.
CPC ......... *H04W 68/005* (2013.01); *H04W 24/08* (2013.01); *H04W 72/0446* (2013.01); *H04W 72/0453* (2013.01); *H04W 72/23* (2023.01)

(58) Field of Classification Search
CPC ............... H04W 68/005; H04W 24/08; H04W 72/0446; H04W 72/0453; H04W 72/23; H04L 5/0044; H04L 5/0094; H04L 5/0053; H04L 5/0023
USPC ........................................................ 370/329
See application file for complete search history.

(56) References Cited

U.S. PATENT DOCUMENTS

| | | | |
|---|---|---|---|
| 2012/0300655 A1* | 11/2012 | Lee ........................ | H04W 24/00 370/252 |
| 2012/0320805 A1* | 12/2012 | Yang ..................... | H04L 1/1861 370/280 |
| 2014/0086202 A1* | 3/2014 | Nagata .................. | H04L 5/0007 370/330 |
| 2014/0293922 A1* | 10/2014 | Wang .................... | H04L 5/0053 370/329 |

(Continued)

FOREIGN PATENT DOCUMENTS

WO    WO-2020067729 A1 *    4/2020    .......... H04W 68/005

*Primary Examiner* — Hassan Kizou
*Assistant Examiner* — Oladiran Gideon Olaleye
(74) *Attorney, Agent, or Firm* — Harrity & Harrity, LLP

(57) ABSTRACT

Various aspects of the present disclosure generally relate to wireless communication. In some aspects, a user equipment (UE) may receive one or more physical downlink control channels (PDCCHs) indicating paging information for a paging message; and receive the paging message on one or more physical downlink shared channels (PDSCHs), wherein at least one of: one or more resources for the one or more PDCCHs, or one or more resources for the one or more PDSCHs, is configured so that cross-slot scheduling of paging and intra-slot scheduling of paging can occur during the same paging occasion. Numerous other aspects are provided.

30 Claims, 12 Drawing Sheets

(56) References Cited

U.S. PATENT DOCUMENTS

| | | | |
|---|---|---|---|
| 2016/0212727 A1* | 7/2016 | Hu | H04W 68/02 |
| 2016/0338006 A1* | 11/2016 | Lee | H04W 52/0229 |
| 2017/0318558 A1* | 11/2017 | Li | H04W 72/23 |
| 2018/0262316 A1* | 9/2018 | Wang | H04B 7/0632 |
| 2018/0332655 A1* | 11/2018 | Ang | H04W 52/0229 |
| 2019/0045492 A1* | 2/2019 | Urabayashi | H04W 74/0833 |
| 2019/0082448 A1* | 3/2019 | Nogami | H04L 5/0053 |
| 2019/0103943 A1* | 4/2019 | Wang | H04L 1/1854 |
| 2019/0254110 A1* | 8/2019 | He | H04W 76/28 |
| 2019/0297576 A1* | 9/2019 | Jose | H04W 52/0216 |
| 2019/0297577 A1* | 9/2019 | Lin | H04W 52/0235 |
| 2020/0120623 A1* | 4/2020 | Pajukoski | H04W 72/23 |
| 2022/0210736 A1* | 6/2022 | Ye | H04W 52/0216 |

\* cited by examiner

PAGING OCCASION SHARING

CROSS-REFERENCE TO RELATED APPLICATION

This Patent Application claims priority to U.S. Provisional Patent Application No. 63/036,794, filed on Jun. 9, 2020, entitled "PAGING OCCASION SHARING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for paging occasion sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving one or more physical downlink control channels (PDCCHs) indicating paging information for a paging message; and receiving the paging message on one or more physical downlink shared channels (PDSCHs), wherein at least one of: one or more resources for the one or more PDCCHs, or one or more resources for the one or more PDSCHs, is configured so that cross-slot scheduling of paging and intra-slot scheduling of paging can occur during the same paging occasion.

In some aspects, a method of wireless communication, performed by a base station, may include transmitting one or more PDCCHs indicating paging information for one or more paging messages; and transmitting the one or more paging messages on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion.

In some aspects, a UE for wireless communication may include a memory and one or more processors operatively coupled to the memory. The memory and the one or more processors may be configured to receive one or more PDCCHs indicating paging information for a paging message; and receive the paging message on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion.

In some aspects, a base station for wireless communication may include a memory and one or more processors operatively coupled to the memory. The memory and the one or more processors may be configured to transmit one or more PDCCHs indicating paging information for one or more paging messages; and transmit the one or more paging messages on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion.

In some aspects, a non-transitory computer-readable medium may store one or more instructions for wireless communication. The one or more instructions, when executed by one or more processors of a UE, may cause the one or more processors to receive one or more PDCCHs indicating paging information for a paging message; and receive the paging message on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion.

In some aspects, a non-transitory computer-readable medium may store one or more instructions for wireless communication. The one or more instructions, when executed by one or more processors of a base station, may cause the one or more processors to transmit one or more PDCCHs indicating paging information for one or more paging messages; and transmit the one or more paging messages on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion.

In some aspects, an apparatus for wireless communication may include means for receiving one or more PDCCHs indicating paging information for a paging message; and means for receiving the paging message on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion.

In some aspects, an apparatus for wireless communication may include means for transmitting one or more PDCCHs indicating paging information for one or more paging messages; and means for transmitting the one or more paging messages on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
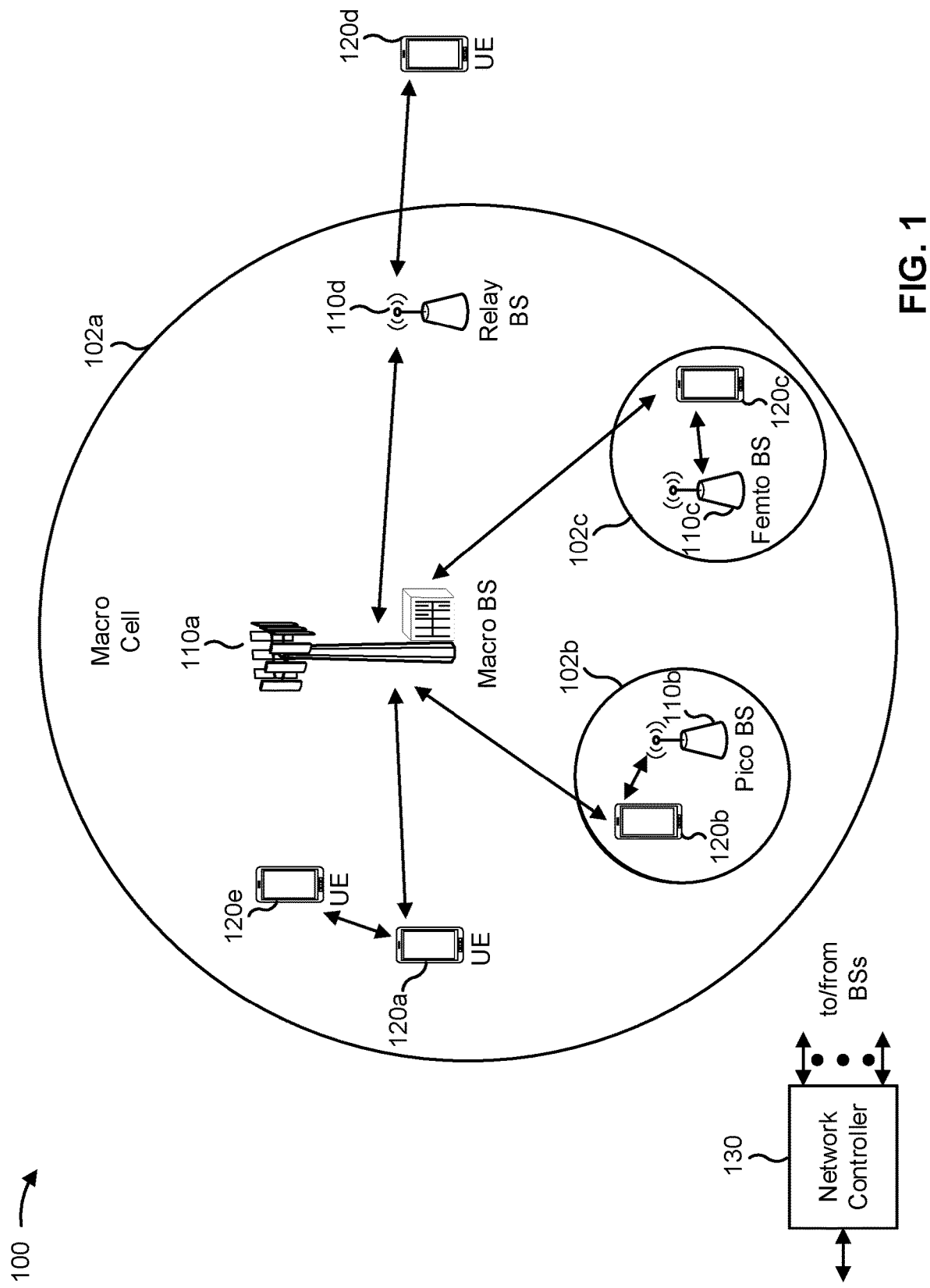
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
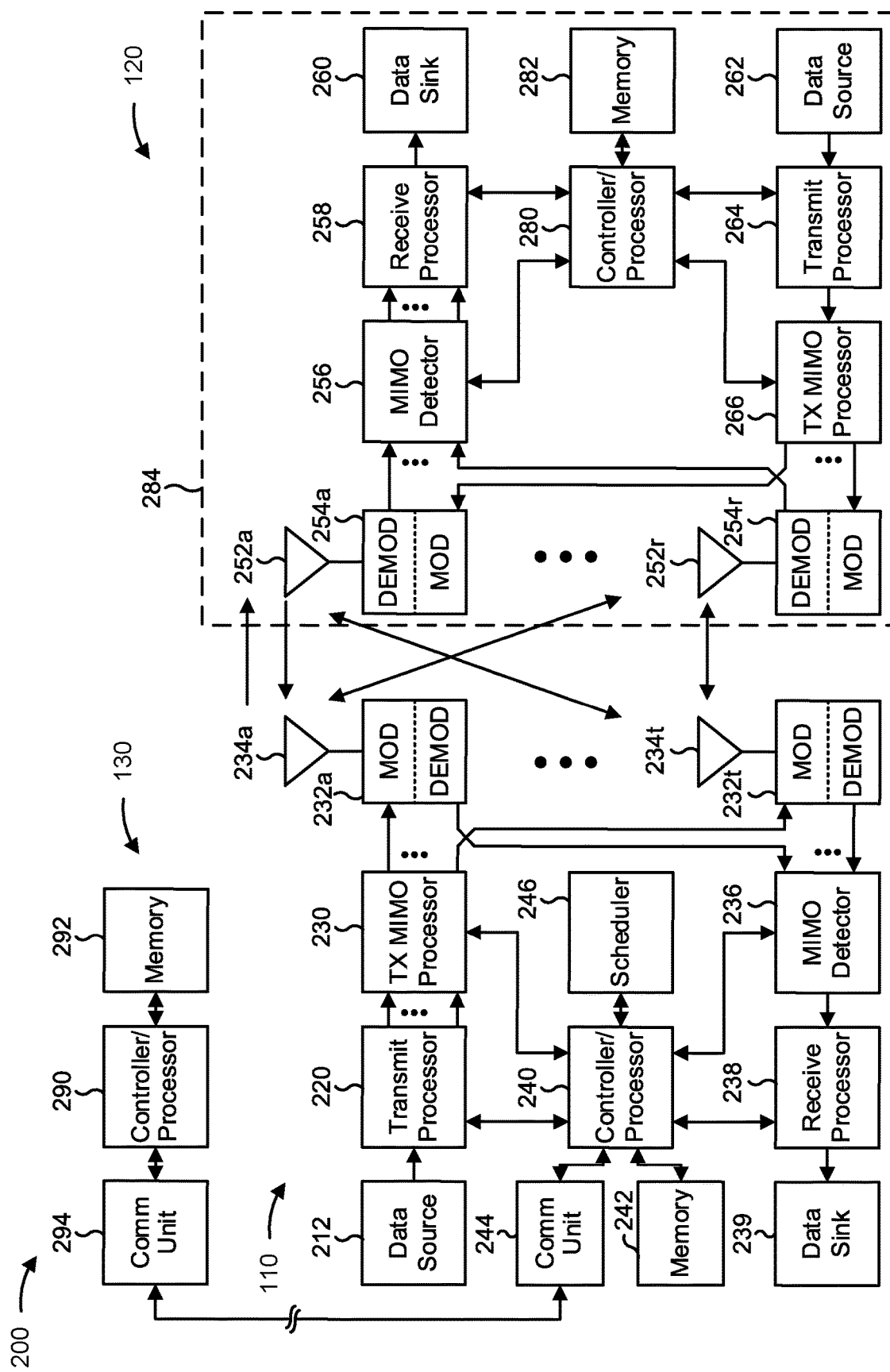
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-10.

Controller/processor 240 of base station 110, controller/processor 280 of UE 120, and/or any other component(s) of FIG. 2 may perform one or more techniques associated with PO sharing among a UE that is capable of cross-slot scheduling and a UE that is not capable of cross-slot scheduling, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for receiving one or more PDCCHs indicating paging information for a paging message; means for receiving the paging message on one or more PDSCHs; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting one or more PDCCHs indicating paging information for one or more paging messages; means for transmitting the one or more paging messages on one or more PDSCHs; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may enter an idle mode (e.g., an LTE or NR radio resource control (RRC) idle mode) or an inactive mode (e.g., an NR RRC inactive mode) in which the UE uses a low power configuration. The UE may enter an inactive mode from a connected mode (such as an RRC connected mode) based at least in part on an RRC release message. In the idle mode, the UE may perform certain monitoring operations, registration area updating, UE controlled mobility, and so on. In the low power configuration, the UE may power down some communication components and may cease monitoring of a data channel (e.g., a physical downlink shared channel (PDSCH)).

If a base station is to transmit a data transmission to a UE in an idle or inactive (idle/inactive or inactive/idle) mode, the base station may page the UE to notify the UE to monitor a data channel for the data transmission. For example, the base station may transmit, to the UE in a physical downlink control channel (PDCCH), downlink control information (DCI) with a cyclic redundancy check (CRC) scrambled using a paging radio network temporary identifier (P-RNTI). The DCI or information carried via the DCI may be referred to as "paging information." For example, "paging information" may refer to information indicating a time domain resource and/or a frequency domain resource for a PDSCH associated with the PDCCH. The P-RNTI may be common for all UEs covered by the base station, and a corresponding data transmission (e.g., PDSCH, paging message) may include information indicating an identity of the paged UE.

The transmission of the DCI (e.g., the paging information) may occur in a paging occasion (PO), which may be defined by a discontinuous reception (DRX) pattern. A PO may include a number of consecutive PDCCH monitoring occasions (MOs) based at least in part on a paging search space set. Each PDCCH MO in a PO may have a one-to-one mapping with a synchronization signal block (SSB) based at least in part on a quasi-colocation (QCL) type. For example, a synchronization signal block may be a QCL Type A or Type D source for a PDCCH MO based at least in part on a configuration referred to as "ssb-PositionInBurst." This configuration may be provided in a system information block (SIB) such as SIB1. Starting from the first PDCCH MO in a paging frame, the starting point of the i-th PO may be determined by the i-th value of a configuration referred to as "firstPDCCH-MonitoringOccasionOfPO", which may also be provided in SIB 1. The same paging message and the same short message may be repeated in all MOs in a PO.

In some aspects, a base station and/or a UE may perform cross-slot scheduling, if the UE supports cross-slot scheduling for paging message transmission. For example, a UE in an idle or inactive mode may buffer a received signal in a paging slot to capture a potential paging PDCCH. The UE may warm up sufficient hardware to decode the paging DCI in order to conserve power relative to entering a fully active mode. If a paging DCI is detected, the UE may warm up additional hardware for PDSCH decoding. The UE may receive and process the PDSCH (e.g., carrying the paging message) in accordance with a scheduling offset (e.g., K0) that indicates a slot offset between the PDCCH and the PDSCH. If the UE does not support cross-slot scheduling for paging message transmission, the paging PDCCH and the PDSCH may be transmitted in the same slot. In these cases, the PDCCH and the PDSCH are in a same PO. A UE that supports cross-slot scheduling for paging message transmission may be referred to herein as a UE that supports cross-slot scheduling. A UE that does not support cross-slot scheduling for paging message transmission may be referred to herein as a UE that does not support cross-slot scheduling or a legacy UE.

In some cases, a first UE that supports cross-slot scheduling for paging message transmission and a second UE that does not support cross-slot scheduling for paging message transmission (referred to as a legacy UE for brevity) may share a same PO. For example, a PDCCH for the first UE may be transmitted in slot N scheduling a PDSCH in slot N+K0, where K0 is the scheduling offset. A PDCCH for the second UE may be transmitted in slot N+K0 scheduling the PDSCH in slot N+K0. However, when a PO is used (e.g., when a paging message is transmitted in the PO), all PDCCH MOs and PDSCH occasions in the PO are occupied, since the same paging message is repeated in all MOs in a PO. Therefore, it may be difficult or impossible to find space in a PO for additional PDCCH MOs for a UE that supports cross-slot scheduling in the PO, since the UE that does not support cross-slot scheduling uses PDCCH MOs in the same slot in the PO. This may lead to inefficient resource allocation and delay in paging of UEs that support cross-slot scheduling.

Some techniques and apparatuses described herein provide PO sharing techniques for a UE that supports cross-slot scheduling for paging message transmission and a UE that does not support cross-slot scheduling for paging message transmission (e.g., a legacy UE), such that paging messages can be scheduled in a cross-slot fashion and an intra-slot fashion during the same PO. For example, PO sharing may be achieved using time division multiplexing (TDM) (e.g., where resources for paging PDCCHs or paging PDSCHs for legacy UEs and UEs that support cross-slot scheduling are multiplexed in a TDM manner). As another example, PO sharing may be achieved using spatial division multiplexing (SDM), for example, using different transmit beams for paging PDCCHs or paging PDSCHs for legacy UEs and UEs that support cross-slot scheduling. As yet another example, PO sharing may be achieved using frequency division multiplexing (FDM), for example, using different frequency resources for paging PDCCHs or paging PDSCHs for legacy UEs and UEs that support cross-slot scheduling. Thus, resource utilization is improved and compatibility of intra-PO sharing for legacy UEs and UEs that support cross-slot scheduling is improved, thereby conserving communication resources and improving throughput, relative to less efficient ways of scheduling paging communications for legacy UEs and UEs that support cross-slot scheduling. Furthermore, power consumption of a UE that supports cross-slot scheduling may be reduced.

FIGS. 3-8 are diagrams illustrating examples 300, 400, 500, 600, 700, and 800 of PO sharing among a UE that is capable of cross-slot scheduling and a UE that is not capable of cross-slot scheduling. A UE that is not capable of cross-slot scheduling is referred to in the description of FIGS. 3-8 as a legacy UE. In some aspects, "legacy UE" may refer to a UE that is not capable of cross-slot scheduling or to a UE that is capable of cross-slot scheduling but is not configured to use cross-slot scheduling (e.g., is not in a cross-slot scheduling mode). Non-cross-slot scheduling of paging, such as for a legacy UE, may be referred to herein as intra-slot scheduling of paging. A UE that is capable of (and configured to use) cross-slot scheduling may be referred to as a cross-slot UE for brevity. The operations shown in FIGS. 3-8 may be performed by a BS 110 and a UE 120. For example, a BS 110 may transmit the communications shown in FIGS. 3-8 to a UE 120, as indicated by the arrows from the BS 110 toward the UE 120. The UE 120 may be a UE capable of cross-slot scheduling or may be a legacy UE. The operations described in connection with FIGS. 3-8 may be performed in a PO, shown, for example, in FIG. 3 by reference number 305.

Figure 3:
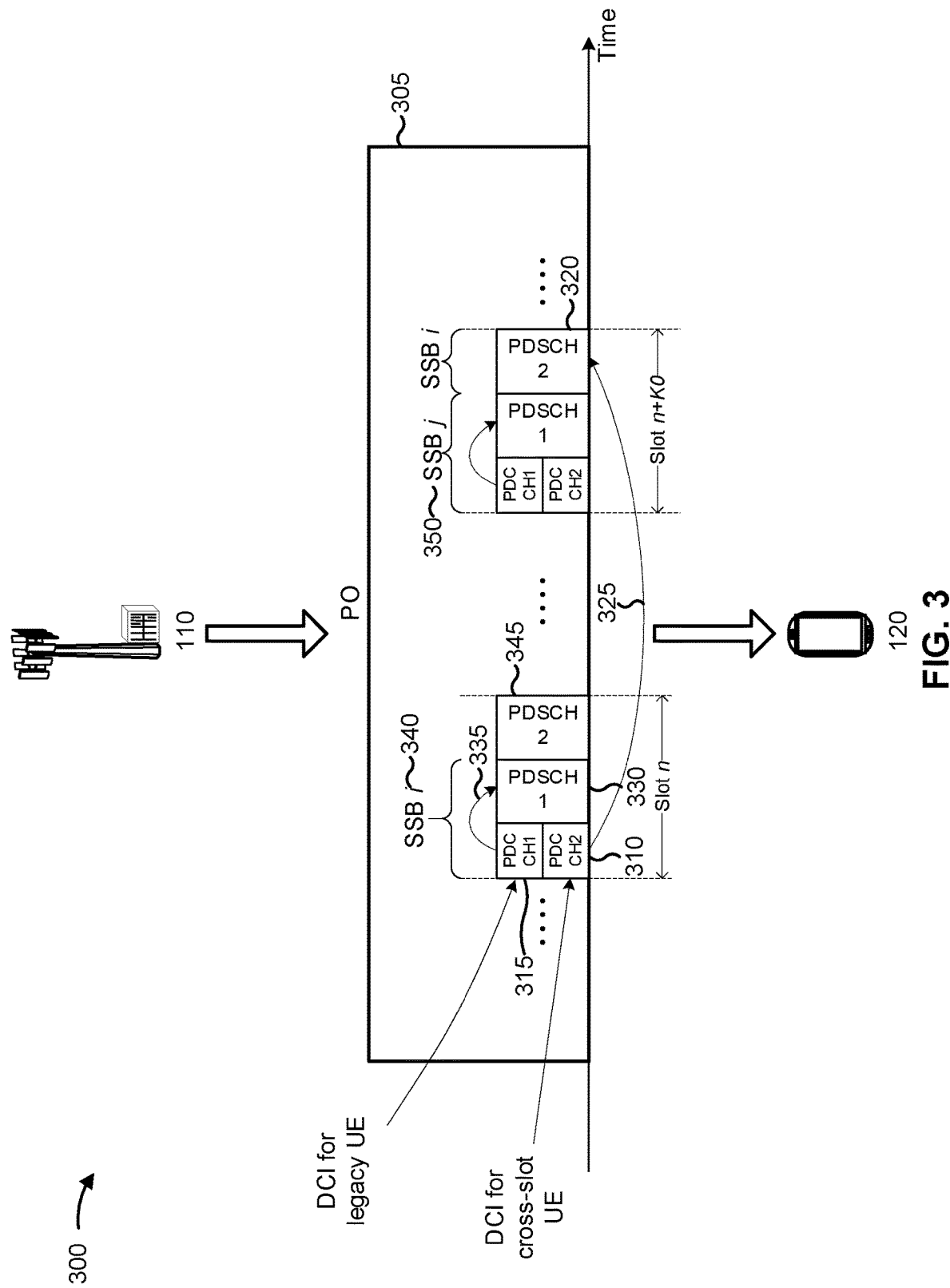
FIGS. 3-8 are diagrams illustrating examples of paging occasion (PO) sharing among a UE that is capable of cross-slot scheduling and a UE that is not capable of cross-slot scheduling, in accordance with the present disclosure.
Figure 4:
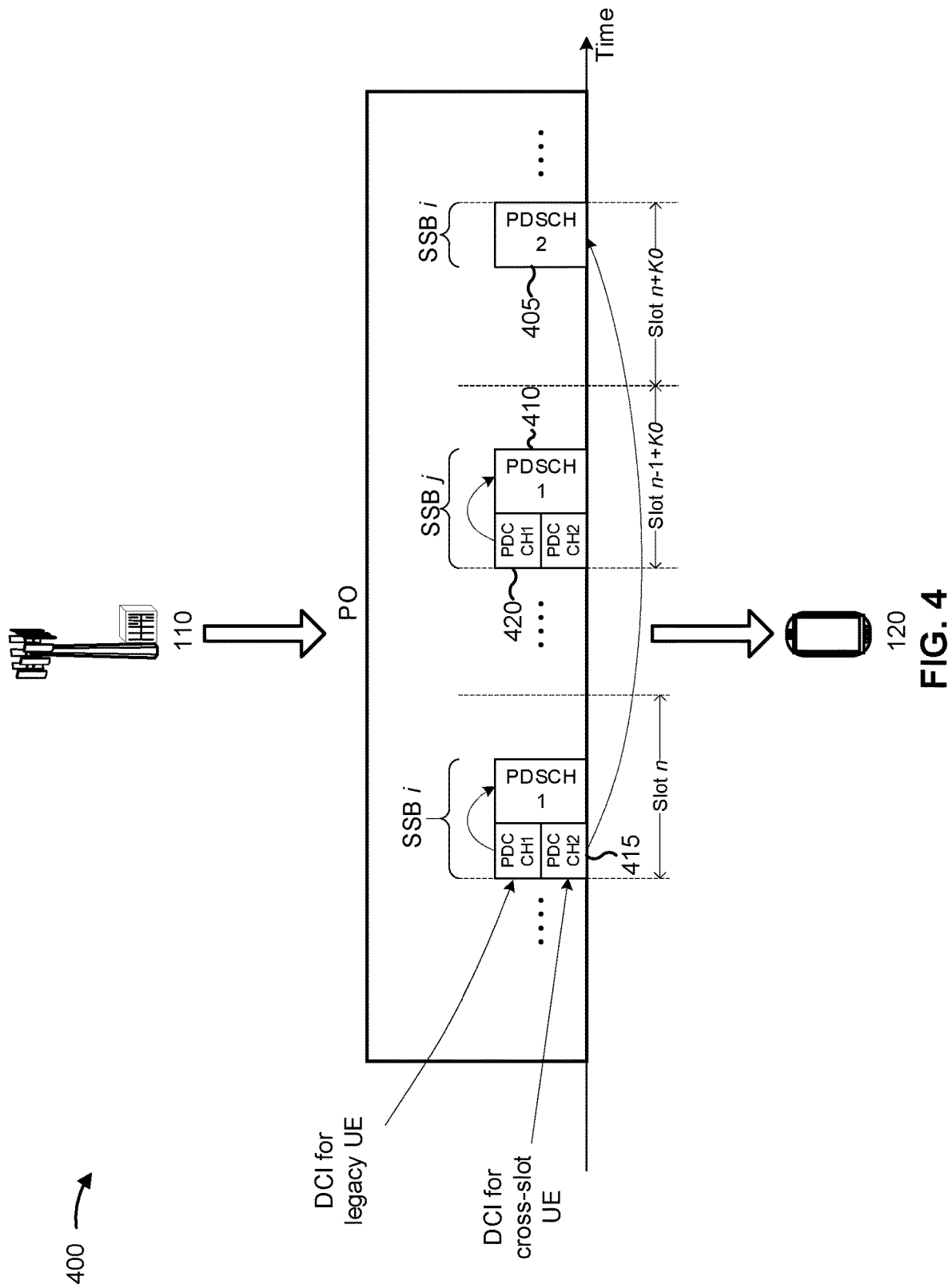

FIGS. 3 and 4 are diagrams illustrating examples 300 and 400 of PO sharing using a TDM approach, where PDCCHs share a monitoring occasion. In example 300, paging PDCCHs 310 and 315 may be transmitted in a same PDCCH monitoring occasion (e.g., via a resource for a PDCCH) in a slot n. For example, the PDCCH 310 may carry DCI (e.g., paging information) for a cross-slot UE, and the PDCCH 315 may carry DCI (e.g., paging information) for a legacy UE. The DCI for the cross-slot UE may indicate a resource for a corresponding PDSCH 320 in a subsequent slot n+K0, as shown by reference number 325. The value K0 may be a scheduling offset for the cross-slot UE, and may be indicated in the PDCCH 310 or the DCI for the cross-slot UE, configured prior to the cross-slot UE receiving the PDCCH 310, or determined by the cross-slot UE. In some aspects, a mapping of the PDSCH 320 may be based at least in part on mini-slots. For example, the mapping of the PDSCH 320 may be performed using a PDSCH Mapping Type B specified by a 3GPP wireless communication specification. In mini-slot based mapping, mapping can begin at any symbol of a slot. As further shown, the DCI for the legacy UE may indicate a corresponding resource for a PDSCH 330 in the slot n, as shown by reference number 335.

As shown by reference number 340, the PDCCHs 310, 315 and the PDSCH 330 may be associated with a first SSB shown as SSB i. For example, the PDCCHs 310, 315 and the PDSCH 330 may be transmitted using a same spatial parameter (e.g., a same beam, a same beam configuration, a same QCL assumption, and/or the like) as the SSB i. The SSB i may be a QCL source for the PDCCHs 310, 315 and the PDSCH 330. Thus, the legacy and cross-slot UEs may assume a same QCL relationship for the PDCCHs 310 and 315. As shown, the PDSCH 320 may also be associated with SSB i. Thus, the cross-slot UE can receive the PDSCH 320 based at least in part on the SSB associated with the PDCCH 310. As further shown, the PDSCH 330 may also be associated with SSB i.

A PDSCH 345 in slot N may be associated with a PDCCH received in a previous slot (e.g., slot n−K0 or a slot preceding slot n−k0), which is not shown in FIG. 3. The PDSCH 345 may be associated with a cross-slot UE (e.g., the same cross-slot UE or a different cross-slot UE than the PDSCH 320). As shown by reference number 350, the PDCCHs of the legacy UE and the cross-slot UE, and the PDSCH of the legacy UE, in slot n+K0 may be associated with an SSB j (e.g., may use SSB j as a QCL source), which may be different than the SSB i. Thus, a PDSCH in a subsequent slot (not shown in FIG. 3), associated with the PDCCH of the cross-slot UE, may be associated with the SSB j.

In this way, a PDSCH of a legacy UE (in a same slot as a corresponding PDCCH) and a PDSCH of a cross-slot UE (in a later slot than a corresponding PDCCH) are multiplexed in a PO on different symbols of a slot of the PO, or in different slots of the PO. This may enable the combination, within a PO, of paging PDCCHs and paging messages (e.g., PDSCHs) for legacy UEs and cross-slot UEs, thereby increasing throughput and reducing resource consumption of cross-slot UEs.

Example 400 shows an example in which a PDSCH 405 of the cross-slot UE is transmitted in a different slot (e.g., on a different resource) than a PDSCH 410 of the legacy UE. For example, the PDSCH 405, transmitted in a resource in slot n+K0, may be indicated by a PDCCH 415 transmitted in a resource in slot n. A PDSCH 410 may be transmitted in a same slot as a corresponding PDCCH 420 (e.g., slot n−1+K0, which precedes slot n+k0). Thus, PDSCHs for the legacy UE and the cross-slot UE may be slot interlaced (e.g., provided in alternating and/or different slots), so resources for the PDSCHs may be configured so that cross-slot scheduling and intra-slot scheduling can be performed during the same PO. In this case, a search space set periodicity of the PDCCHs used for paging may be at least two slots (e.g., a paging search space set periodicity may be at least two slots).

In some aspects, the PO shown in example 300 and/or example 400 may have an extended length relative to a PO for a legacy UE. For example, the length of the PO may be extended by at least (K0−1) (e.g., the scheduling offset minus one) slots, which allows time for the transmission of the PDCCH for the cross-slot UE before the scheduling offset has elapsed or the transmission of the PDSCH for the cross-slot UE after the scheduling offset has elapsed.

Figure 5:
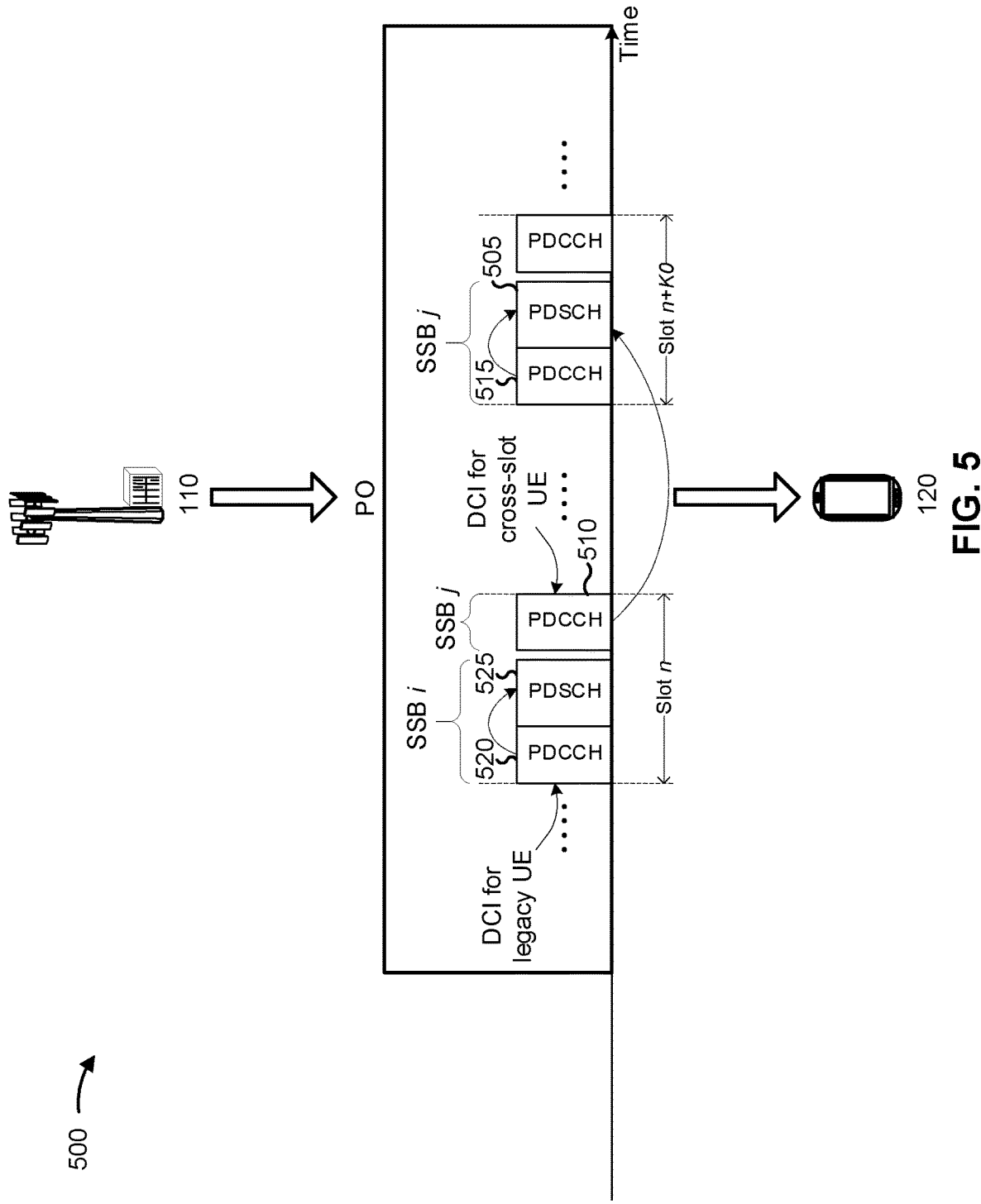
Figure 6:
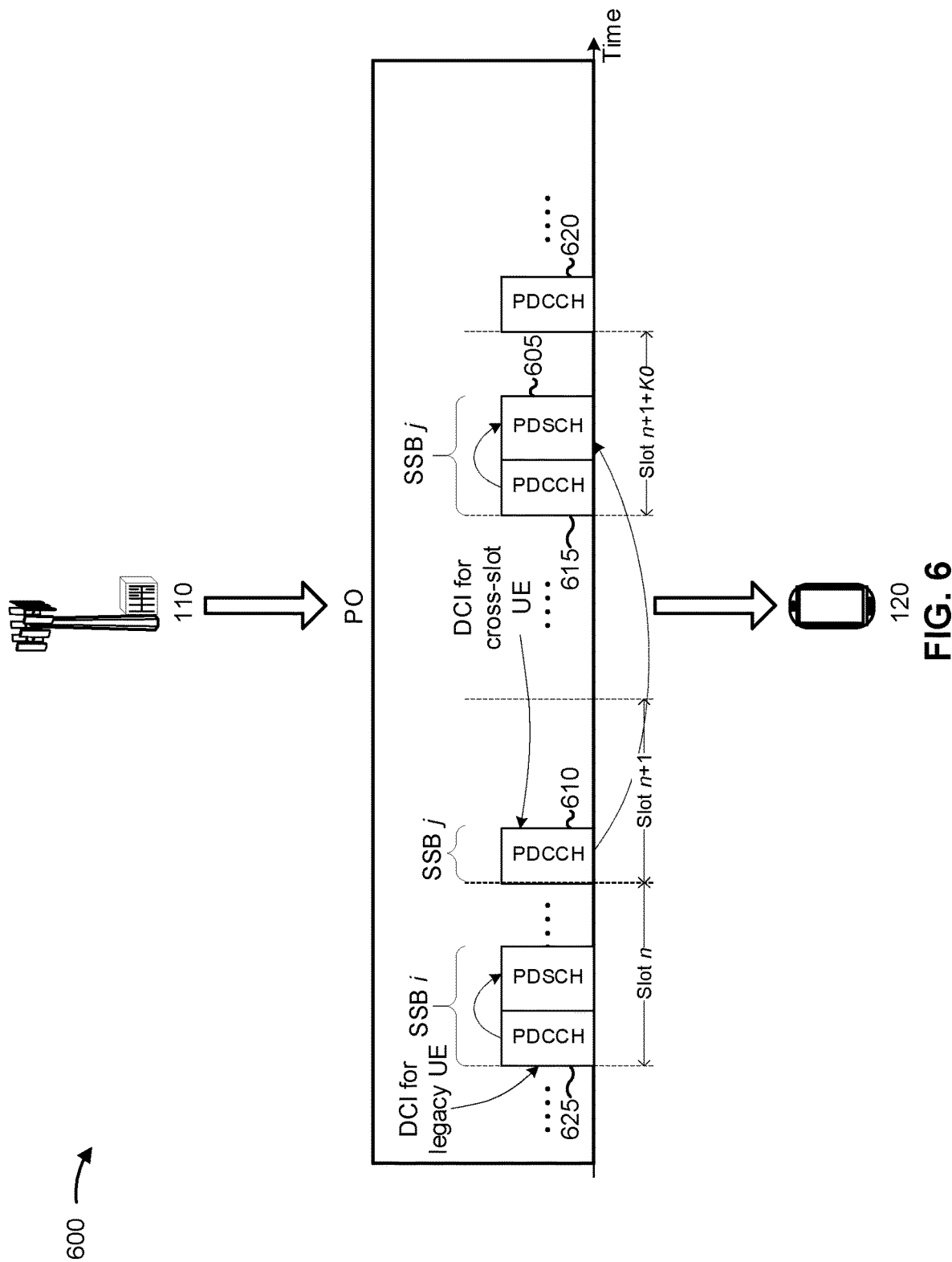

FIGS. 5 and 6 are diagrams illustrating examples 500 and 600 of PO sharing using a TDM approach, where a PDSCH (and a resource for the PDSCH) is shared between UEs. In example 500, a PDSCH 505 is shared between a legacy UE and a cross-slot UE, meaning that the PDSCH 505 is directed to the legacy UE and the cross-slot UE, for example, based at least in part on respective radio network temporary identifiers, temporary mobile subscriber identities, or other identifiers of the legacy UE and the cross-slot UE. In some aspects, "a PDSCH shared between legacy UEs and cross-slot UEs" may refer to multiple PDSCHs (e.g., multiple paging messages carried on one or more PDSCHs) that are multiplexed with each other using SDM, FDM, TDM, and/or the like. A PDSCH that is shared between a legacy UE and a cross-slot UE is referred to herein as configured for cross-slot scheduling of paging and for intra-slot scheduling of paging.

The PDCCH 510 may carry DCI indicating a resource for the PDSCH 505 for the cross-slot UE, and the PDCCH 515 may carry DCI indicating a resource for the PDSCH 505 for the legacy UE. The PDCCH 510 may be transmitted on slot n, and the PDCCH 515 and the PDSCH 505 may be transmitted on slot n+K0, in accordance with the scheduling offset indicated by the PDCCH 510. Thus, the PDSCH 505 may be shared between the legacy UE and the cross-slot UE, and the PDCCHs 510 and 515 may be transmitted on separate slots (e.g., on different POs in the separate slots), thereby enabling the transmission of the PDCCHs 510 and 515 within a single PO. In some aspects, as shown, the PDCCH 515, the PDCCH 510, and the PDSCH 505 may be associated with a same SSB (e.g., SSB j), whereas a PDCCH 520 and PDSCH 525 on slot n may be associated with a different SSB (e.g., SSB i), which enables the multiplexing of the PDCCHs of the legacy and the cross-slot UE in the slot n. In some aspects, a PDCCH MO for the legacy UE and a PDCCH MO for the cross-slot UE may appear in a same slot on different symbols. For example, in example 500, the PDCCH MO for the legacy UE is provided at a start of the slot and the PDCCH MO for the cross-slot UE is provided at an end of the slot. In some aspects, the PDCCH MO for the cross-slot UE may be provided at a center of the slot or at another location in the slot (e.g., in a middle region of the slot).

In example 600, a PDSCH 605 (and a resource for the PDSCH 605) is shared between a legacy UE and a cross-slot UE (e.g., configured for cross-slot scheduling paging and for intra-slot scheduling of paging). A PDCCH 610 indicating the PDSCH 605 for the cross-slot UE may be transmitted on a resource in a different slot than a resource for a PDCCH 615 indicating the PDSCH 605 for the legacy UE. For example, PDCCHs 610 and 620 associated with the cross-slot UE may be transmitted in slot n+1 and in slot n+2+K0, and PDCCHs 615 and 625 associated with the legacy UE may be transmitted in slot n and in slot n+1+K0. Thus, PDCCHs for legacy UEs and cross-slot UEs may be slot-interlaced, and the corresponding resources may be configured so that cross-slot scheduling and intra-slot scheduling of paging messages can be performed during the same PO. In this example, as in example 400, a paging search space set periodicity for the PDCCHs 610 and 620 and/or the PDCCHs 615 and 620 may be at least 2 slots.

Figure 7:
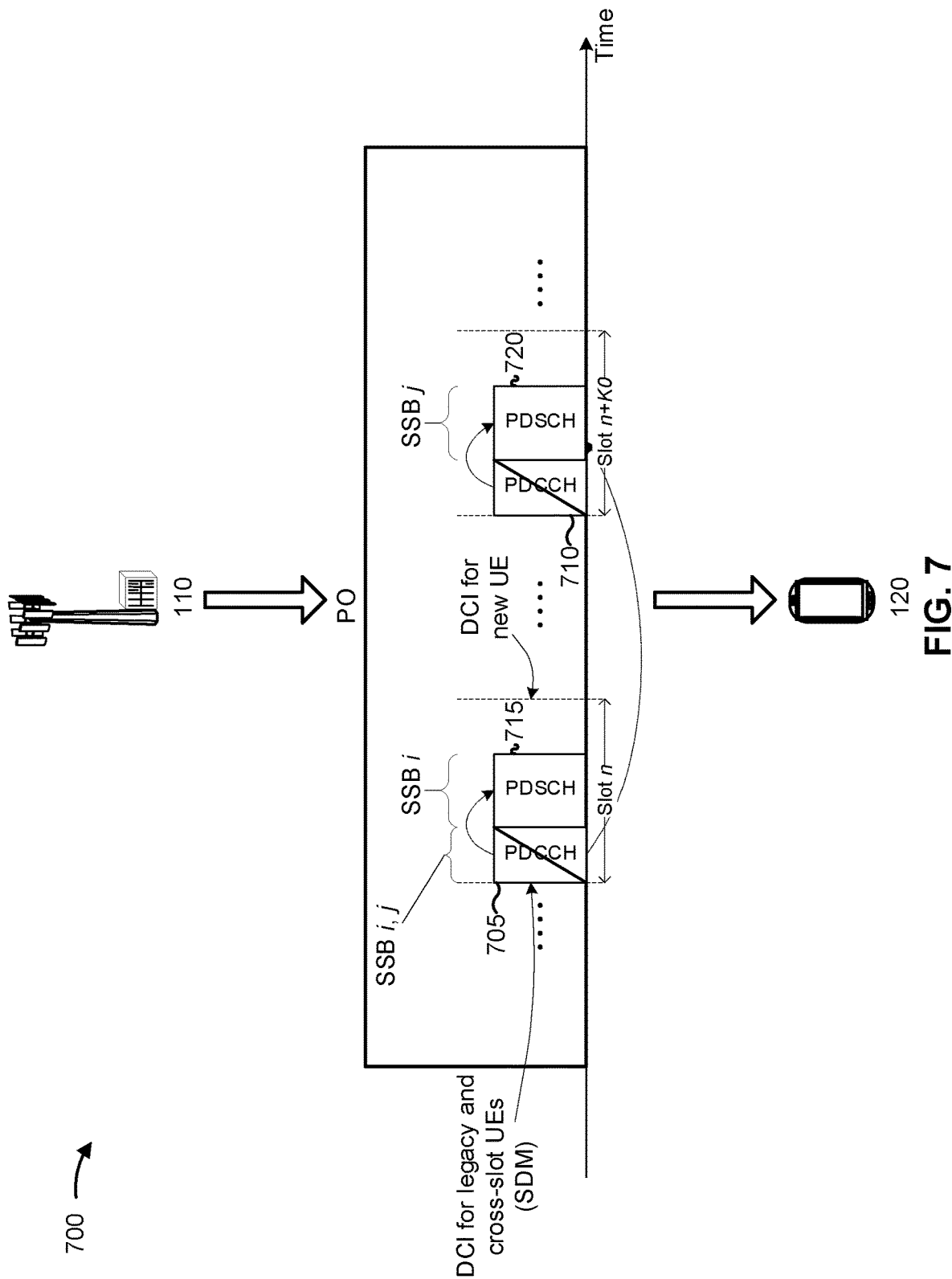
Figure 8:
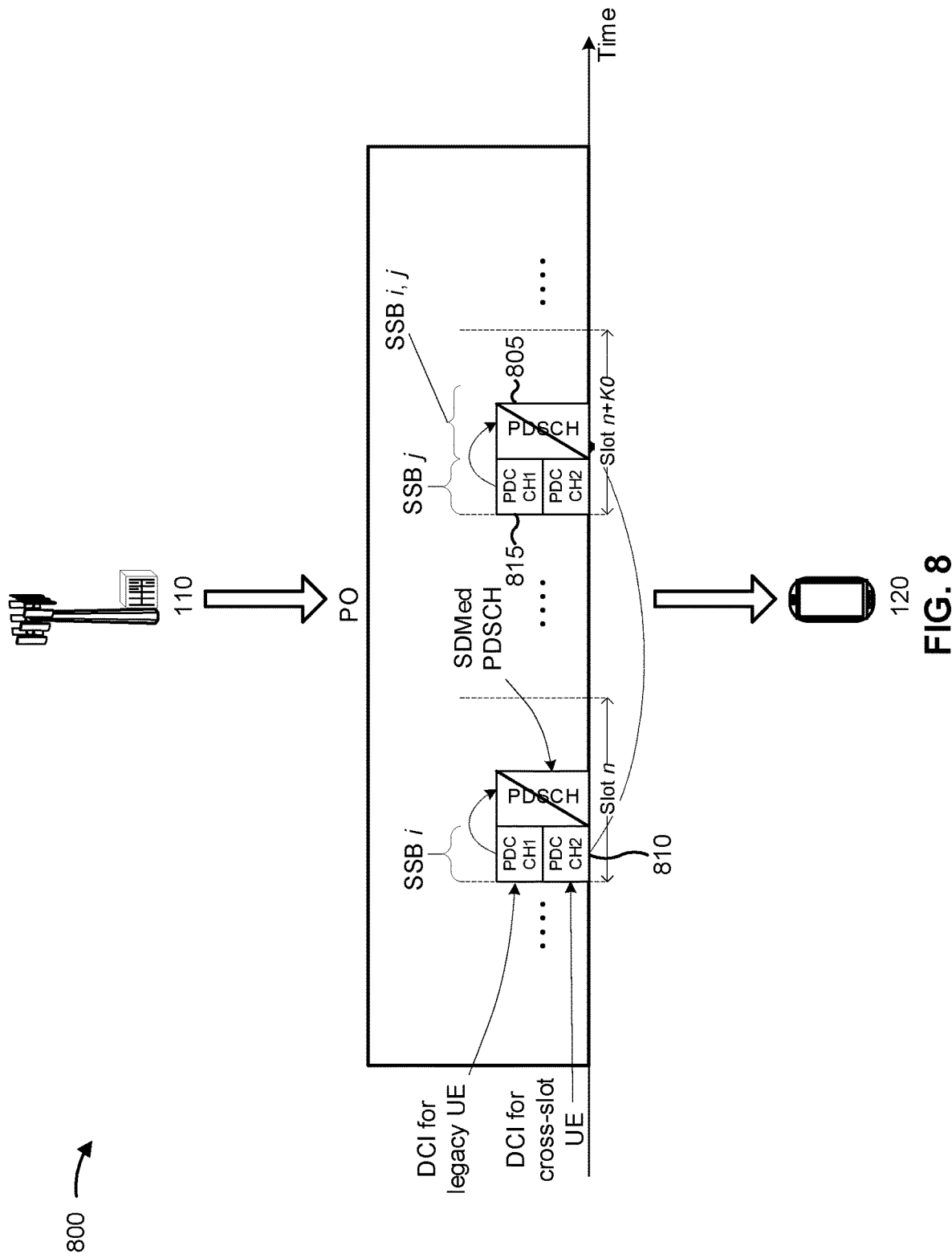

FIGS. 7 and 8 are diagrams illustrating examples 700 and 800 of PO sharing using an SDM and/or FDM approach. Examples 700 and 800 may be performed by a BS 110 having a multi-beam capability, such as a BS 110 capable of concurrently generating two or more transmit beams that are spatially distinct from each other. In example 700, a single PDCCH monitoring occasion 705/710 is associated with (e.g., shared between) a legacy UE and a cross-slot UE, meaning that the PDCCH is configured for cross-slot scheduling of paging and for intra-slot scheduling of paging. In example 800, PDSCHs of the legacy UE and the cross-slot UE can share a same set of time/frequency resources 805, so the PDSCHs may be shared between the legacy and the cross-slot UE. In some aspects, the PDSCHs may be configured for cross-slot scheduling of paging and for intra-slot scheduling of paging.

As shown in FIG. 7, a PDCCH monitoring occasion 705 may include two PDCCHs (indicated by the diagonal line through the PDCCH monitoring occasion 705): a first PDCCH for a legacy UE that indicates a PDSCH 715, and a second PDCCH for a cross-slot UE that indicates a PDSCH 720. For example, the first PDCCH and the second PDCCH may be transmitted on a same time/frequency resource of the PDCCH monitoring occasion 705. This may be referred to as a PDCCH or a PDCCH monitoring occasion being shared between a legacy UE and a cross-slot UE, or a PDCCH or PDCCH monitoring occasion configured so that cross-slot scheduling of paging and intra-slot scheduling of paging can be performed during the same PO. In some aspects, a DCI indicating a paging message (e.g., indicating the PDSCH 715 and/or the PDSCH 720) may be transmitted on the first PDCCH and the second PDCCH, so the DCI is shared between the legacy UE and the cross-slot UE. A PDCCH, PDCCH monitoring occasion, DCI, or PDSCH can be shared in the spatial domain (e.g., using spatial division multiplexing), the time domain (e.g., using time division multiplexing), the frequency domain (e.g., using frequency division multiplexing), or a combination thereof.

In some aspects, the first PDCCH and the second PDCCH may be transmitted using a multi-user communication scheme, such as an orthogonal multi-user multiple-input multiple-output (MU-MIMO) scheme or a non-orthogonal MU-MIMO scheme. In some aspects, the first PDCCH and the second PDCCH may be transmitted using FDM. For example, control resource sets or PDCCH candidates of the first PDCCH and the second PDCCH may be multiplexed with each other in the frequency domain on a time resource corresponding to the PDCCH monitoring occasion 705, which reduces multi-user interference of the first PDCCH and the second PDCCH. In some aspects, the PDSCH 720 may be shared between a cross-slot UE and a legacy UE based at least in part on PDCCHs received on the PDCCH monitoring occasion 705 and the PDCCH monitoring occasion 710, respectively. For example, the PDSCH 720, which may be associated with SSB j, may be transmitted using a same beam as a PDCCH for the legacy UE that is transmitted using a same beam as SSB j on the PDCCH monitoring occasion 710 and a PDCCH for the cross-slot UE that is transmitted using a same beam as SSB j on the PDCCH monitoring occasion 705. Furthermore, the PDSCH 715 may be associated with SSB i, and may be transmitted using a same beam as a PDCCH for the legacy UE on the PDCCH monitoring occasion 705. Thus, PDCCHs may be multiplexed in the spatial domain on a PDCCH monitoring occasion, and may indicate a shared PDSCH, which enables the coexistence of legacy UEs and cross-slot UEs in a PO.

As shown in FIG. 8, in some aspects, a time/frequency resource 805 used to transmit a PDSCH may be shared between a legacy UE and a cross-slot UE. For example, a PDCCH 810, transmitted in a slot n in association with SSB i, and a PDCCH 815, transmitted in a slot n+K0 in association with SSB j, may both be associated with PDSCHs on the time/frequency resource 805 (e.g., based at least in part on respective PDCCH monitoring occasions of the PDCCH 810 and the PDCCH 815). Additionally, or alternatively, a same DCI indicating the PDSCHs on the time/frequency resource 805 may be carried on the PDCCH 810 and the 815. The BS 110 may transmit the PDSCHs on the time/frequency resource 805 using beams corresponding to SSB i (for a PDSCH associated with the PDCCH 810) and SSB j (for a PDSCH associated with the PDCCH 815). For example, the PDSCHs may be multiplexed with each other in the spatial domain, as indicated by the diagonal line in the time/frequency resource 805. In some aspects, the PDSCHs may be multiplexed with each other in the frequency domain (not shown), which may reduce multi-user interference. In some aspects, the PDSCHs may be transmitted using a multi-user communication scheme, such as an orthogonal MU-MIMO scheme or a non-orthogonal MU-MIMO scheme. Thus, PDSCHs may be multiplexed in the spatial domain on a time/frequency resource 805, which enables the coexistence of legacy UEs and cross-slot UEs in a PO. Thus, the time/frequency resource 805 may be configured so that cross-slot scheduling of paging messages and intra-slot scheduling of paging messages can occur during the same PO.

As indicated above, FIGS. 3-8 are provided as examples. Other examples may differ from what is provided with regard to FIGS. 3-8.

Figure 9:
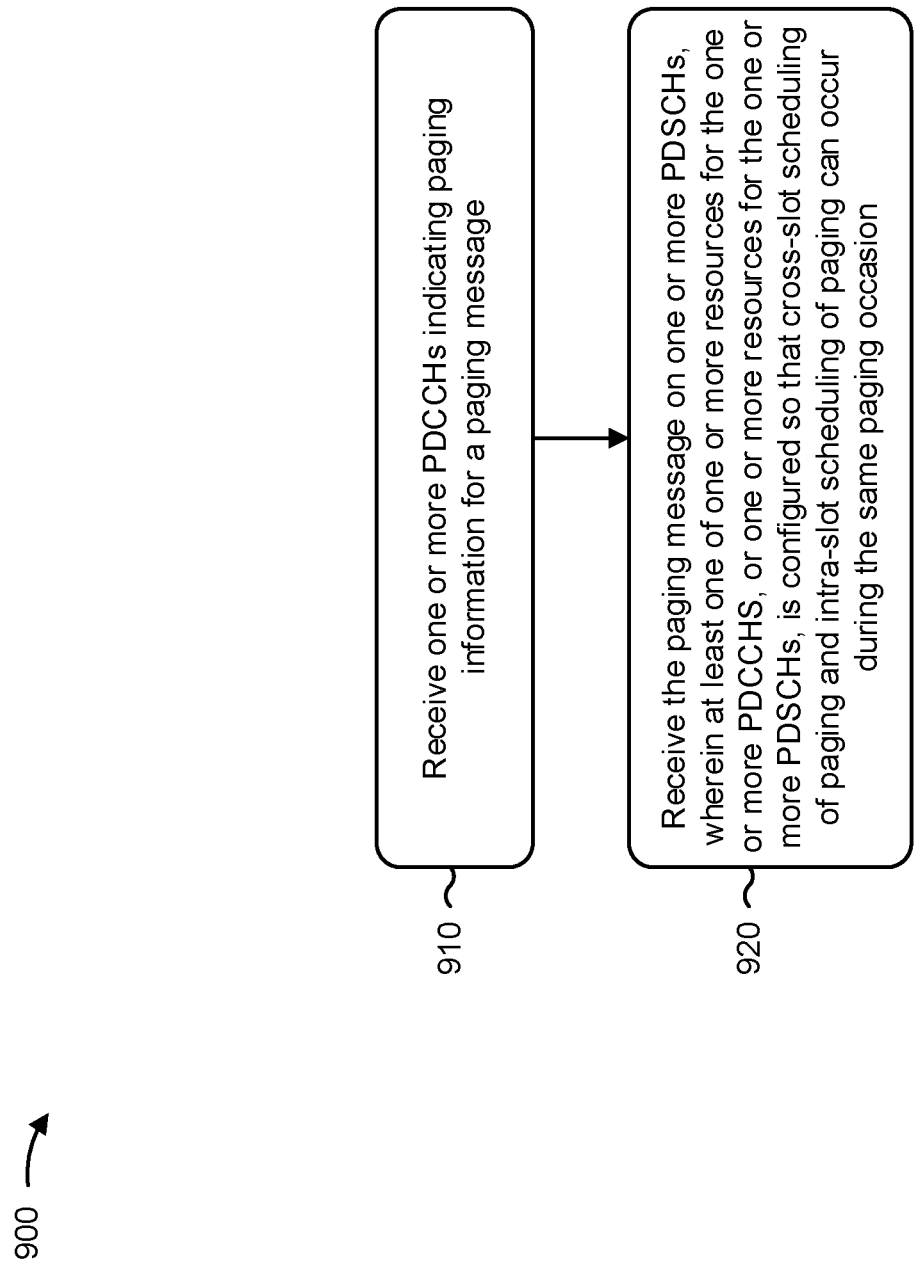
FIGS. 9-10 are diagrams illustrating example processes associated with PO sharing among a UE that is capable of cross-slot scheduling and a UE that is not capable of cross-slot scheduling, in accordance with the present disclosure.

FIG. 9 is a diagram illustrating an example process 900 performed, for example, by a UE, in accordance with the present disclosure. Example process 900 is an example where a UE (e.g., UE 120, a UE capable of cross-slot scheduling, a cross-slot UE, a legacy UE, and/or the like) performs operations associated with paging occasion sharing. In some aspects, one or more of the operations described with regard to example process 900 may be performed by a legacy UE.

As shown in FIG. 9, in some aspects, process 900 may include receiving one or more PDCCHs indicating paging information for a paging message (block 910). For example, the UE (e.g., using antenna 252, DEMOD 254, MIMO detector 256, receive processor 258, controller/processor 280, and/or the like) may receive one or more PDCCHs indicating paging information (e.g., DCI) for a paging message, as described above.

As further shown in FIG. 9, in some aspects, process 900 may include receiving the paging message on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion (block 920). For example, the UE (e.g., using antenna 252, DEMOD 254, MIMO detector 256, receive processor 258, controller/processor 280, and/or the like) may receive the paging message on one or more PDSCHs, as described above. In some aspects, at least one of: one or more resources for the one or more PDCCHs, or one or more resources for the one or more PDSCHs, is configured so that cross-slot scheduling of paging and intra-slot scheduling of paging can occur during the same paging occasion. For example, PDSCH 720 of example 700 is shared between the first UE and the second UE. As another example, a PDCCH monitoring occasion (that is, a resource for a PDCCH) may be shared between respective PDSCHs of the first UE and the second UE. As yet another example, a DCI message carried by a PDCCH or by multiple different PDCCHs may be associated with (e.g., may map to) respective PDSCHs of the first UE and the second UE. As still another example, resources for PDCCHs may be configured to occur in different slots of a PO, in different frequency resources of a slot, and/or in different time resources of a slot.

In some aspects, the operation shown by block 920 may include receiving the paging message on one or more PDSCHs, wherein at least one of the one or more PDCCHs, or the one or more PDSCHs, is shared between the first UE and a second UE, wherein the first UE is capable of cross-slot scheduling and the second UE is not capable of cross-slot scheduling. In some aspects, the first UE is capable of cross-slot scheduling (e.g., a cross-slot UE) and the second UE is not capable of cross-slot scheduling (e.g., a legacy UE).

Process 900 may include additional aspects, such as any single aspect or any combination of aspects described below and/or in connection with one or more other processes described elsewhere herein.

In a first aspect, the one or more PDCCHs comprise two or more PDCCHs that are received on a same monitoring occasion.

In a second aspect, alone or in combination with the first aspect, the two or more PDCCHs are associated with a same synchronization signal block.

In a third aspect, alone or in combination with one or more of the first and second aspects, the two or more PDCCHs are frequency division multiplexed with each other.

In a fourth aspect, alone or in combination with one or more of the first through third aspects, the one or more PDSCHs comprise two or more PDSCHs that are time division multiplexed.

In a fifth aspect, alone or in combination with one or more of the first through fourth aspects, the one or more PDSCHs comprise two or more PDSCHs that are received in a same slot on different symbols.

In a sixth aspect, alone or in combination with one or more of the first through fifth aspects, a PDSCH, of the two or more PDSCHs, for the UE is mapped based at least in part on mini-slots.

In a seventh aspect, alone or in combination with one or more of the first through sixth aspects, the one or more PDSCHs comprise two or more PDSCHs that are received in different slots.

In an eighth aspect, alone or in combination with one or more of the first through seventh aspects, the two or more PDSCHs are slot interlaced with each other.

In a ninth aspect, alone or in combination with one or more of the first through eighth aspects, a paging search space set periodicity for the one or more PDCCHs is at least two slots.

In a tenth aspect, alone or in combination with one or more of the first through ninth aspects, the one or more PDSCHs comprise a single PDSCH, and the one or more PDCCHs comprise two or more PDCCHs that are received in a same slot on different symbols.

In an eleventh aspect, alone or in combination with one or more of the first through tenth aspects, a PDCCH, of the two or more PDCCHs, for the first UE is received after a PDCCH, of the two or more PDCCHs, for the second UE.

In a twelfth aspect, alone or in combination with one or more of the first through eleventh aspects, the two or more PDCCHs are received in different monitoring occasions associated with different synchronization signal blocks.

In a thirteenth aspect, alone or in combination with one or more of the first through twelfth aspects, the one or more PDSCHs comprise a single PDSCH, and the one or more PDCCHs comprise two or more PDCCHs that are received in different slots.

In a fourteenth aspect, alone or in combination with one or more of the first through thirteenth aspects, the two or more PDCCHs are slot interlaced with each other.

In a fifteenth aspect, alone or in combination with one or more of the first through fourteenth aspects, the one or more PDCCHs comprise two or more PDCCHs that are received on respective beams in a same monitoring occasion.

In a sixteenth aspect, alone or in combination with one or more of the first through fifteenth aspects, the two or more PDCCHs are associated with corresponding synchronization signal blocks.

In a seventeenth aspect, alone or in combination with one or more of the first through sixteenth aspects, the two or more PDCCHs are received on a same time-frequency resource.

In an eighteenth aspect, alone or in combination with one or more of the first through seventeenth aspects, the one or more PDSCHs comprise a single PDSCH that is associated with all of the one or more PDCCHs.

In a nineteenth aspect, alone or in combination with one or more of the first through eighteenth aspects, the one or more PDSCHs comprise two or more PDSCHs that are received on a same time-frequency resource on respective beams.

In a twentieth aspect, alone or in combination with one or more of the first through nineteenth aspects, the one or more PDCCHs comprise two or more PDCCHs that correspond to the two or more PDSCHs and that are received on a same monitoring occasion.

In a twenty-first aspect, alone or in combination with one or more of the first through twentieth aspects, the two or more PDSCHs are associated with the paging information, and the paging information comprises a downlink control information message.

In a twenty-second aspect, alone or in combination with one or more of the first through twenty-first aspects, at least one of the one or more PDCCHs or the one or more PDSCHs is transmitted based at least in part on a multi-user multiple-input multiple-output scheme.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
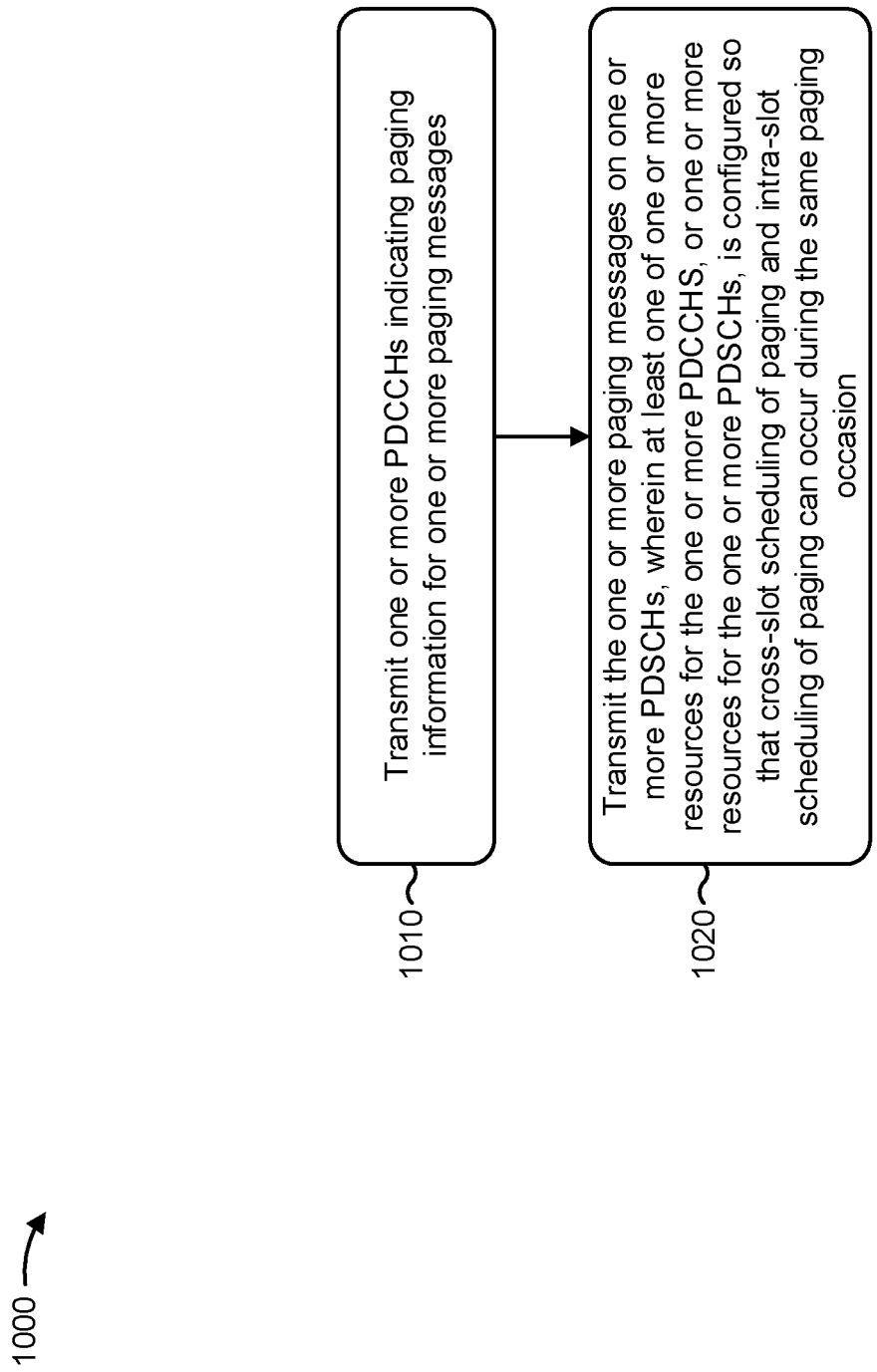

FIG. 10 is a diagram illustrating an example process 1000 performed, for example, by a base station, in accordance with the present disclosure. Example process 1000 is an example where a base station (e.g., BS 110 and/or the like) performs operations associated with paging occasion sharing.

As shown in FIG. 10, in some aspects, process 1000 may include transmitting one or more PDCCHs indicating paging information for one or more paging messages (block 1010). For example, the base station may transmit one or more PDCCHs indicating paging information (e.g., DCI) for one or more paging messages, as described above. A paging message may be carried on a PDSCH.

As further shown in FIG. 10, in some aspects, process 1000 may include transmitting the one or more paging messages on one or more PDSCHs, wherein at least one of: one or more resources for the one or more PDCCHs, or one or more resources for the one or more PDSCHs, is configured so that cross-slot scheduling of paging and intra-slot scheduling of paging can occur during the same paging occasion (block 1020). For example, the base station (e.g., using controller/processor 240, transmit processor 220, TX MIMO processor 230, MOD 232, antenna 234, and/or the like) may transmit the one or more paging messages on one or more PDSCHs, as described above. In some aspects, at least one of: one or more resources for the one or more PDCCHs, or one or more resources for the one or more PDSCHs, is configured so that cross-slot scheduling of paging and intra-slot scheduling of paging can occur during the same paging occasion. For example, PDSCH 720 of example 700 is shared between the first UE and the second UE. As another example, a PDCCH monitoring occasion (that is, a resource for a PDCCH) may be shared between respective PDSCHs of the first UE and the second UE. As yet another example, a DCI message carried by a PDCCH or by multiple different PDCCHs may be associated with (e.g., may map to) respective PDSCHs of the first UE and the second UE. As still another example, resources for PDCCHs may be configured to occur in different slots of a PO, in different frequency resources of a slot, and/or in different time resources of a slot. In some aspects, the first UE is capable of cross-slot scheduling and the second UE is not capable of cross-slot scheduling.

Process 1000 may include additional aspects, such as any single aspect or any combination of aspects described below and/or in connection with one or more other processes described elsewhere herein.

In a first aspect, the one or more PDCCHs comprise two or more PDCCHs that are transmitted on a same monitoring occasion.

In a second aspect, alone or in combination with the first aspect, the two or more PDCCHs are associated with a same synchronization signal block.

In a third aspect, alone or in combination with one or more of the first and second aspects, the two or more PDCCHs are frequency division multiplexed with each other.

In a fourth aspect, alone or in combination with one or more of the first through third aspects, the one or more PDSCHs comprise two or more PDSCHs that are time division multiplexed.

In a fifth aspect, alone or in combination with one or more of the first through fourth aspects, the one or more PDSCHs comprise two or more PDSCHs that are transmitted in a same slot on different symbols.

In a sixth aspect, alone or in combination with one or more of the first through fifth aspects, a PDSCH, of the two or more PDSCHs, for the first UE is mapped based at least in part on mini-slots.

In a seventh aspect, alone or in combination with one or more of the first through sixth aspects, the one or more PDSCHs comprise two or more PDSCHs that are transmitted in different slots.

In an eighth aspect, alone or in combination with one or more of the first through seventh aspects, the two or more PDSCHs are slot interlaced with each other.

In a ninth aspect, alone or in combination with one or more of the first through eighth aspects, a paging search space set periodicity for the one or more PDCCHs is at least two slots.

In a tenth aspect, alone or in combination with one or more of the first through ninth aspects, the one or more PDSCHs comprise a single PDSCH, and the one or more PDCCHs comprise two or more PDCCHs that are transmitted in a same slot on different symbols.

In an eleventh aspect, alone or in combination with one or more of the first through tenth aspects, a PDCCH, of the two or more PDCCHs, for a UE capable of cross-slot scheduling is transmitted after a PDCCH, of the two or more PDCCHs, for a UE that is not capable of cross-slot scheduling.

In a twelfth aspect, alone or in combination with one or more of the first through eleventh aspects, the two or more PDCCHs are transmitted in different monitoring occasions associated with different synchronization signal blocks.

In a thirteenth aspect, alone or in combination with one or more of the first through twelfth aspects, the one or more PDSCHs comprise a single PDSCH, and the one or more PDCCHs comprise two or more PDCCHs that are transmitted in different slots.

In a fourteenth aspect, alone or in combination with one or more of the first through thirteenth aspects, the two or more PDCCHs are slot interlaced with each other.

In a fifteenth aspect, alone or in combination with one or more of the first through fourteenth aspects, the one or more PDCCHs comprise two or more PDCCHs that are transmitted on respective beams in a same monitoring occasion.

In a sixteenth aspect, alone or in combination with one or more of the first through fifteenth aspects, the two or more PDCCHs are associated with corresponding synchronization signal blocks.

In a seventeenth aspect, alone or in combination with one or more of the first through sixteenth aspects, the two or more PDCCHs are transmitted on a same time-frequency resource.

In an eighteenth aspect, alone or in combination with one or more of the first through seventeenth aspects, the one or more PDSCHs comprise a single PDSCH that is associated with all of the one or more PDCCHs.

In a nineteenth aspect, alone or in combination with one or more of the first through eighteenth aspects, the one or more PDSCHs comprise two or more PDSCHs that are transmitted on a same time-frequency resource on respective beams.

In a twentieth aspect, alone or in combination with one or more of the first through nineteenth aspects, the one or more PDCCHs comprise two or more PDCCHs that correspond to the two or more PDSCHs and that are transmitted on a same monitoring occasion.

In a twenty-first aspect, alone or in combination with one or more of the first through twentieth aspects, the two or more PDSCHs are associated with the paging information, and the paging information comprises a downlink control information message.

In a twenty-second aspect, alone or in combination with one or more of the first through twenty-first aspects, at least one of the one or more PDCCHs or the one or more PDSCHs is transmitted based at least in part on a multi-user multiple-input multiple-output scheme.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
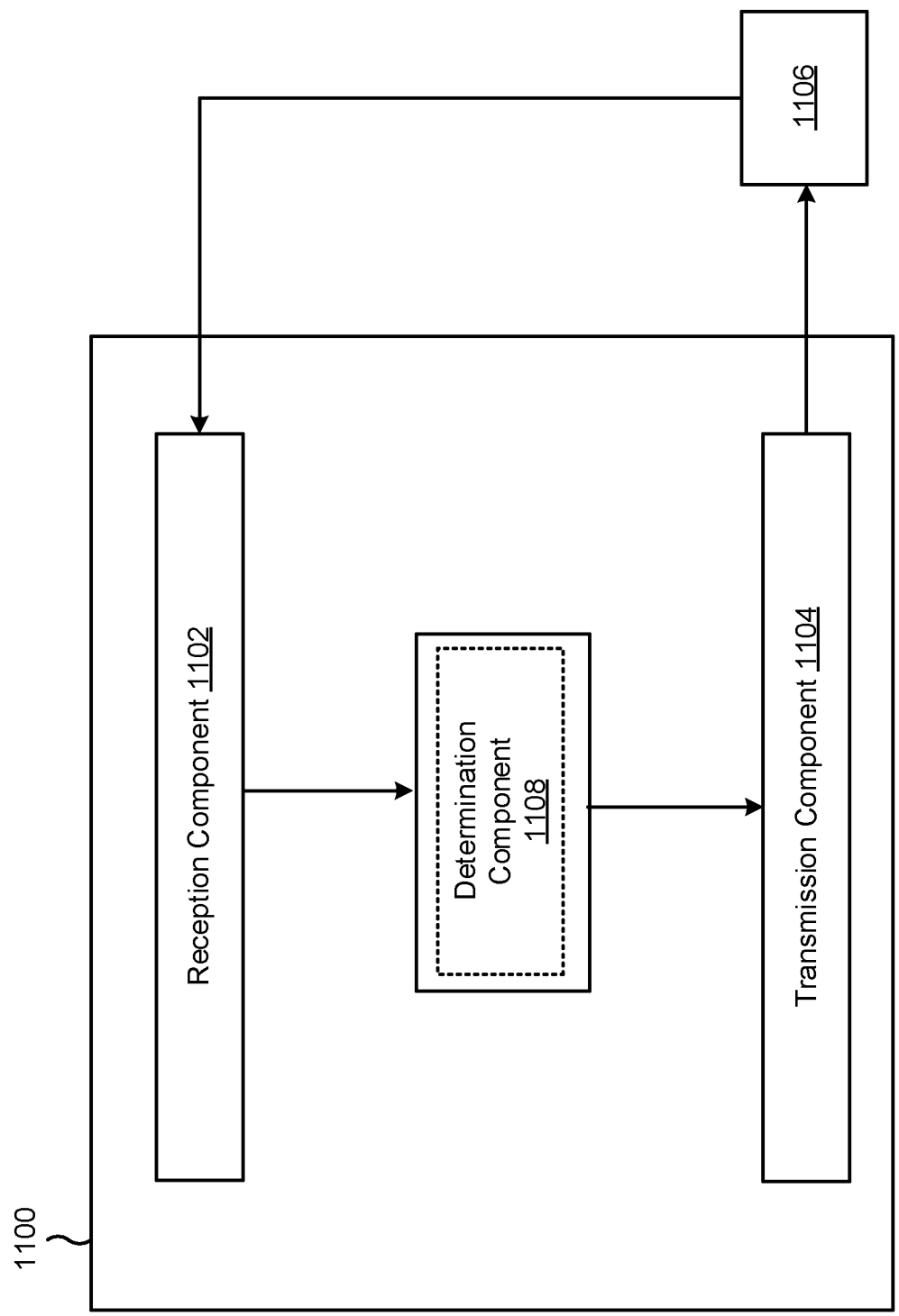
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 3-8. Additionally or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The reception component 1102 may receive one or more PDCCHs indicating paging information for a paging message, and may receive the paging message on one or more PDSCHs, wherein at least one of the one or more PDCCHs, or the one or more PDSCHs, is shared between the apparatus 1100 and a second UE, wherein the apparatus 1100 is capable of cross-slot scheduling and the second UE is not capable of cross-slot scheduling. The determination component 1108 may determine a relationship between the one or more PDCCHs and the one or more PDSCHs, may determine a PDSCH to monitor based at least in part on a corresponding PDCCH of the one or more PDCCHs, and/or the like.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
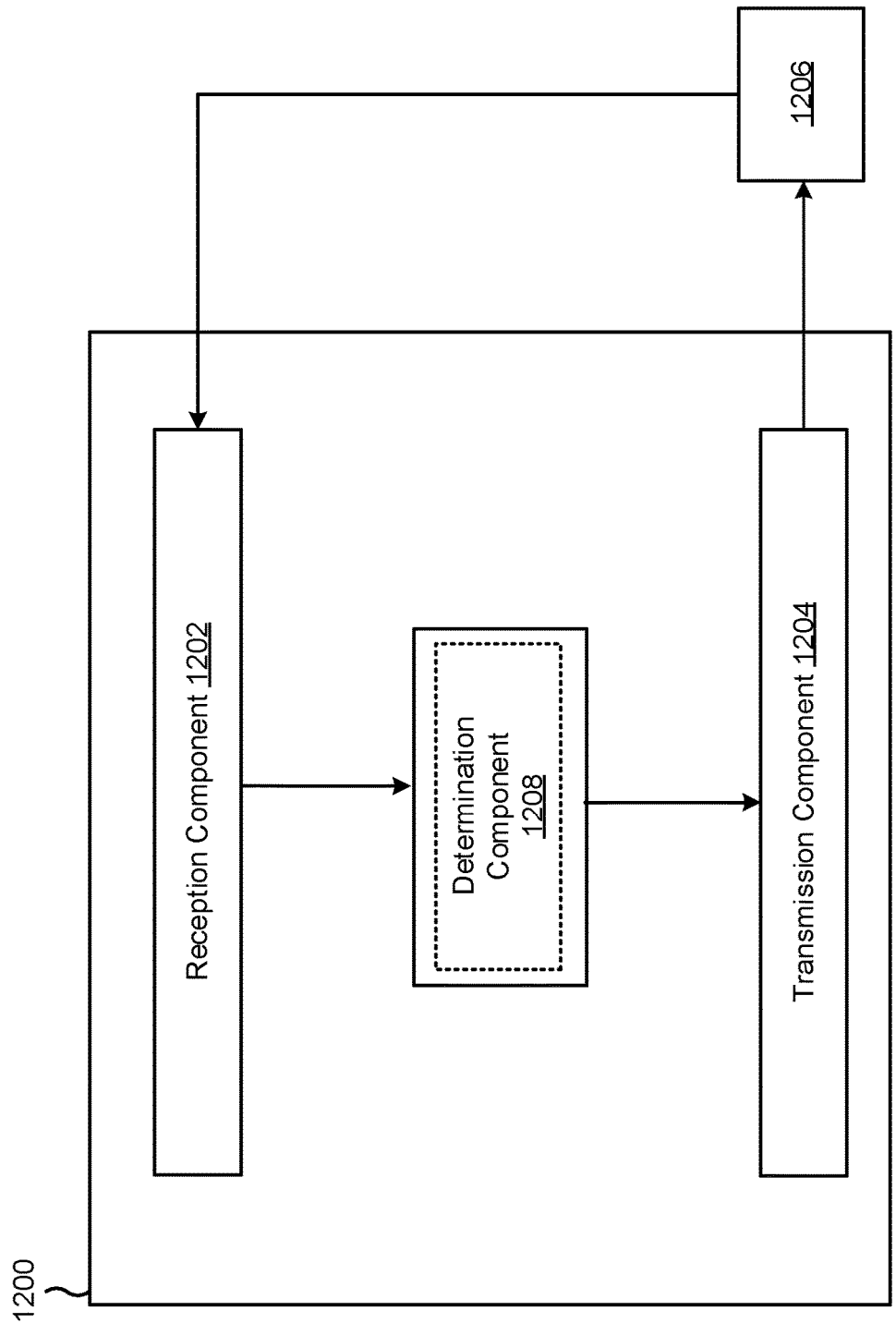

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 3-8. Additionally or alternatively, the apparatus 1200 may be configured to perform one or more processes described herein, such as process 1000 of FIG. 10. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be collocated with the reception component 1202 in a transceiver.

The transmission component 1204 may transmit one or more PDCCHs indicating paging information for one or more paging messages. The transmission component 1204 may also transmit the one or more paging messages on one or more PDSCHs, wherein at least one of the one or more PDCCHs, or the one or more PDSCHs, is shared between a first UE and a second UE, wherein the first UE is capable of cross-slot scheduling and the second UE is not capable of cross-slot scheduling. The determination component 1208 may determine a relationship between the one or more PDCCHs and the one or more PDSCHs, may determine a PDSCH to monitor based at least in part on a corresponding PDCCH of the one or more PDCCHs, and/or the like.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving one or more physical downlink control channels (PDCCHs) indicating paging information for a paging message; and receiving the paging message on one or more physical downlink shared channels (PDSCHs), wherein at least one of: one or more resources for the one or more PDCCHs, or one or more resources for the one or more PDSCHs, is configured so that cross-slot scheduling of paging and intra-slot scheduling of paging can occur during the same paging occasion.

Aspect 2: The method of Aspect 1, wherein the one or more PDCCHs comprise two or more PDCCHs that are received on a same monitoring occasion.

Aspect 3: The method of Aspect 2, wherein the two or more PDCCHs are associated with a same synchronization signal block.

Aspect 4: The method of Aspect 2, wherein the two or more PDCCHs are frequency division multiplexed with each other.

Aspect 5: The method of Aspect 2, wherein the one or more PDSCHs comprise two or more PDSCHs that are time division multiplexed.

Aspect 6: The method of Aspect 2, wherein the one or more PDCCHs comprise two or more PDCCHs that are received in a same slot on different symbols.

Aspect 7: The method of Aspect 6, wherein a PDSCH, of the two or more PDSCHs, for the UE is mapped based at least in part on mini-slots.

Aspect 8: The method of Aspect 2, wherein the one or more PDSCHs comprise two or more PDSCHs that are received in different slots.

Aspect 9: The method of Aspect 8, wherein the two or more PDSCHs are slot interlaced with each other.

Aspect 10: The method of any of Aspects 1-9, wherein a paging search space set periodicity for the one or more PDCCHs is at least two slots.

Aspect 11: The method of any of Aspects 110, wherein the one or more PDSCHs comprise a single PDSCH, and wherein the one or more PDCCHs comprise two or more PDCCHs that are received in a same slot on different symbols.

Aspect 12: The method of Aspect 11, wherein a PDCCH, of the two or more PDCCHs, for the first UE is received after a PDCCH, of the two or more PDCCHs, for the second UE.

Aspect 13: The method of Aspect 11, wherein the two or more PDCCHs are received in different monitoring occasions associated with different synchronization signal blocks.

Aspect 14: The method of any of Aspects 1-13, wherein the one or more PDSCHs comprise a single PDSCH, and wherein the one or more PDCCHs comprise two or more PDCCHs that are received in different slots.

Aspect 15: The method of Aspect 14, wherein the two or more PDCCHs are slot interlaced with each other.

Aspect 16: The method of any of Aspects 1-15, wherein the one or more PDCCHs comprise two or more PDCCHs that are received on respective beams in a same monitoring occasion.

Aspect 17: The method of Aspect 16, wherein the two or more PDCCHs are associated with corresponding synchronization signal blocks.

Aspect 18: The method of Aspect 16, wherein the two or more PDCCHs are received on a same time-frequency resource.

Aspect 19: The method of any of Aspects 1-18, wherein the one or more PDSCHs comprise a single PDSCH that is associated with all of the one or more PDCCHs.

Aspect 20: The method of any of Aspects 1-19, wherein the one or more PDSCHs comprise two or more PDSCHs that are received on a same time-frequency resource on respective beams.

Aspect 21: The method of Aspect 20, wherein the one or more PDCCHs comprise two or more PDCCHs that correspond to the two or more PDSCHs and that are received on a same monitoring occasion.

Aspect 22: The method of Aspect 20, wherein the two or more PDSCHs are associated with the paging information, and wherein the paging information comprises a downlink control information message.

Aspect 23: The method of any of Aspects 1-22, wherein at least one of the one or more PDCCHs or the one or more PDSCHs is transmitted based at least in part on a multi-user multiple-input multiple-output scheme.

Aspect 24: A method of wireless communication performed by a base station, comprising: transmitting one or more physical downlink control channels (PDCCHs) indicating paging information for one or more paging messages; and transmitting the one or more paging messages on one or more physical downlink shared channels (PDSCHs), wherein at least one of: one or more resources for the one or more PDCCHs, or one or more resources for the one or more PDSCHs, is configured so that cross-slot scheduling of paging and intra-slot scheduling of paging can occur during the same paging occasion.

Aspect 25: The method of Aspect 24, wherein the one or more PDCCHs comprise two or more PDCCHs that are transmitted on a same monitoring occasion.

Aspect 26: The method of Aspect 25, wherein the two or more PDCCHs are associated with a same synchronization signal block.

Aspect 27: The method of Aspect 25, wherein the two or more PDCCHs are frequency division multiplexed with each other.

Aspect 28: The method of Aspect 25, wherein the one or more PDSCHs comprise two or more PDSCHs that are time division multiplexed.

Aspect 29: The method of Aspect 25, wherein the one or more PDSCHs comprise two or more PDSCHs that are transmitted in a same slot on different symbols.

Aspect 30: The method of Aspect 29, wherein a PDSCH, of the two or more PDSCHs, for the first UE is mapped based at least in part on mini-slots.

Aspect 31: The method of Aspect 25, wherein the one or more PDSCHs comprise two or more PDSCHs that are transmitted in different slots.

Aspect 32: The method of Aspect 31, wherein the two or more PDSCHs are slot interlaced with each other.

Aspect 33: The method of any of Aspects 24-32, wherein a paging search space set periodicity for the one or more PDCCHs is at least two slots.

Aspect 34: The method of any of Aspects 24-33, wherein the one or more PDSCHs comprise a single PDSCH, and wherein the one or more PDCCHs comprise two or more PDCCHs that are transmitted in a same slot on different symbols.

Aspect 35: The method of Aspect 34, wherein a PDCCH, of the two or more PDCCHs, for a UE capable of cross-slot scheduling is transmitted after a PDCCH, of the two or more PDCCHs, for a UE that is not capable of cross-slot scheduling.

Aspect 36: The method of Aspect 34, wherein the two or more PDCCHs are transmitted in different monitoring occasions associated with different synchronization signal blocks.

Aspect 37: The method of Aspect 34, wherein the one or more PDSCHs comprise a single PDSCH, and wherein the one or more PDCCHs comprise two or more PDCCHs that are transmitted in different slots.

Aspect 38: The method of Aspect 37, wherein the two or more PDCCHs are slot interlaced with each other.

Aspect 39: The method of any of Aspects 24-38, wherein the one or more PDCCHs comprise two or more PDCCHs that are transmitted on respective beams in a same monitoring occasion.

Aspect 40: The method of Aspect 39, wherein the two or more PDCCHs are associated with corresponding synchronization signal blocks.

Aspect 41: The method of Aspect 39, wherein the two or more PDCCHs are transmitted on a same time-frequency resource.

Aspect 42: The method of any of Aspects 24-41, wherein the one or more PDSCHs comprise a single PDSCH that is associated with all of the one or more PDCCHs.

Aspect 43: The method of any of Aspects 24-41, wherein the one or more PDSCHs comprise two or more PDSCHs that are transmitted on a same time-frequency resource on respective beams.

Aspect 44: The method of Aspect 43, wherein the one or more PDCCHs comprise two or more PDCCHs that correspond to the two or more PDSCHs and that are transmitted on a same monitoring occasion.

Aspect 45: The method of Aspect 43, wherein the two or more PDSCHs are associated with the paging information, and wherein the paging information comprises a downlink control information message.

Aspect 46: The method of any of Aspects 24-45, wherein at least one of the one or more PDCCHs or the one or more PDSCHs is transmitted based at least in part on a multi-user multiple-input multiple-output scheme.

Aspect 47: An apparatus for wireless communication at a device, comprising a processor; memory coupled with the processor; and instructions stored in the memory and executable by the processor to cause the apparatus to perform the method of one or more of Aspects 1-46.

Aspect 48: A device for wireless communication, comprising a memory and one or more processors coupled to the memory, the one or more processors configured to perform the method of one or more of Aspects 1-46.

Aspect 49: An apparatus for wireless communication, comprising at least one means for performing the method of one or more of Aspects 1-46.

Aspect 50: A non-transitory computer-readable medium storing code for wireless communication, the code comprising instructions executable by a processor to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory; and
one or more processors coupled to the memory, wherein the one or more processors are configured to:
receive one or more physical downlink control channels (PDCCHs) indicating paging information for a paging message; and
receive the paging message on one or more physical downlink shared channels (PDSCHs),
wherein at least one of:
one or more resources for the one or more PDCCHs, or
one or more resources for the one or more PDSCHs,
is configured so that cross-slot scheduling of paging and intra-slot scheduling of paging can occur during a same paging occasion, and wherein:
the cross-slot scheduling of paging comprises a first PDCCH in a first slot indicating a first resource in a second slot different than the first slot for a first PDSCH, and
the intra-slot scheduling of paging comprises a second PDCCH in the first slot indicating a second resource in the first slot for a second PDSCH.

2. The apparatus of claim 1, wherein the one or more PDCCHs comprise two or more PDCCHs on a same monitoring occasion.

3. The apparatus of claim 2, wherein the two or more PDCCHs are associated with a same synchronization signal block.

4. The apparatus of claim 2, wherein the two or more PDCCHs are frequency division multiplexed with each other.

5. The apparatus of claim 2, wherein the one or more PDSCHs comprise two or more PDSCHs that are time division multiplexed.

6. The apparatus of claim 2, wherein the one or more PDSCHs comprise two or more PDSCHs in a same slot on different symbols.

7. The apparatus of claim 2, wherein the one or more PDSCHs comprise two or more PDSCHs that are received in different slots.

8. The apparatus of claim 1, wherein a paging search space set periodicity for the one or more PDCCHs is at least two slots.

9. The apparatus of claim 1, wherein the one or more PDSCHs comprise a single PDSCH, and wherein the one or more PDCCHs comprise two or more PDCCHs that are received in a same slot on different symbols.

10. The apparatus of claim 1, wherein the one or more PDSCHs comprise a single PDSCH, and wherein the one or more PDCCHs comprise two or more PDCCHs that are received in different slots.

11. The apparatus of claim 1, wherein the one or more PDCCHs comprise two or more PDCCHs on respective beams in a same monitoring occasion.

12. The apparatus of claim 1, wherein the one or more PDSCHs comprise a single PDSCH that is associated with all of the one or more PDCCHs.

13. The apparatus of claim 1, wherein the one or more PDSCHs comprise two or more PDSCHs on a same time-frequency resource on respective beams.

14. The apparatus of claim 1, wherein at least one of the one or more PDCCHs or the one or more PDSCHs is transmitted based at least in part on a multi-user multiple-input multiple-output scheme.

15. An apparatus for wireless communication, comprising:
a memory; and
one or more processors coupled to the memory, wherein the one or more processors are configured to:
transmit one or more physical downlink control channels (PDCCHs) indicating paging information for one or more paging messages; and
transmit the one or more paging messages on one or more physical downlink shared channels (PDSCHs),
wherein at least one of:
one or more resources for the one or more PDCCHs, or
one or more resources for the one or more PDSCHs,
is configured so that cross-slot scheduling of paging and intra-slot scheduling of paging can occur during a same paging occasion, and wherein:
the cross-slot scheduling of paging comprises a first PDCCH in a first slot indicating a first resource in a second slot different than the first slot for a first PDSCH, and
the intra-slot scheduling of paging comprises a second PDCCH in the first slot indicating a second resource in the first slot for a second PDSCH.

16. The apparatus of claim 15, wherein the one or more PDCCHs comprise two or more PDCCHs that are transmitted on a same monitoring occasion.

17. The apparatus of claim 15, wherein the one or more PDSCHs comprise a single PDSCH, and wherein the one or more PDCCHs comprise two or more PDCCHs that are transmitted in a same slot on different symbols.

18. The apparatus of claim 15, wherein the one or more PDSCHs comprise two or more PDSCHs that are transmitted on a same time-frequency resource on respective beams.

19. A method of wireless communication, comprising:
receiving one or more physical downlink control channels (PDCCHs) indicating paging information for a paging message; and
receiving the paging message on one or more physical downlink shared channels (PDSCHs),
wherein at least one of:
one or more resources for the one or more PDCCHs, or
one or more resources for the one or more PDSCHs, is configured so that cross-slot scheduling of paging and intra-slot scheduling of paging can occur during a same paging occasion, and wherein:
the cross-slot scheduling of paging comprises a first PDCCH in a first slot indicating a first resource in a second slot different than the first slot for a first PDSCH, and
the intra-slot scheduling of paging comprises a second PDCCH in the first slot indicating a second resource in the first slot for a second PDSCH.

20. The method of claim 19, wherein the one or more PDCCHs comprise two or more PDCCHs that are received on a same monitoring occasion.

21. The method of claim 19, wherein a paging search space set periodicity for the one or more PDCCHs is at least two slots.

22. The method of claim 19, wherein the one or more PDSCHs comprise a single PDSCH, and wherein the one or more PDCCHs comprise two or more PDCCHs that are received in a same slot on different symbols.

23. The method of claim 19, wherein the one or more PDSCHs comprise a single PDSCH, and wherein the one or more PDCCHs comprise two or more PDCCHs that are received in different slots.

24. The method of claim 19, wherein the one or more PDCCHs comprise two or more PDCCHs that are received on respective beams in a same monitoring occasion.

25. The method of claim 19, wherein the one or more PDSCHs comprise a single PDSCH that is associated with all of the one or more PDCCHs.

26. The method of claim 19, wherein the one or more PDSCHs comprise two or more PDSCHs that are received on a same time-frequency resource on respective beams.

27. The method of claim 19, wherein at least one of the one or more PDCCHs or the one or more PDSCHs is transmitted based at least in part on a multi-user multiple-input multiple-output scheme.

28. A method of wireless communication, comprising:
transmitting one or more physical downlink control channels (PDCCHs) indicating paging information for one or more paging messages; and
transmitting the one or more paging messages on one or more physical downlink shared channels (PDSCHs), wherein at least one of:
one or more resources for the one or more PDCCHs, or
one or more resources for the one or more PDSCHs,
is configured so that cross-slot scheduling of paging and intra-slot scheduling of paging can occur during a same paging occasion, and wherein:
the cross-slot scheduling of paging comprises a first PDCCH in a first slot indicating a first resource in a second slot different than the first slot for a first PDSCH, and
the intra-slot scheduling of paging comprises a second PDCCH in the first slot indicating a second resource in the first slot for a second PDSCH.

29. The method of claim 28, wherein the one or more PDCCHs comprise two or more PDCCHs that are transmitted on a same monitoring occasion.

30. The method of claim 28, wherein a paging search space set periodicity for the one or more PDCCHs is at least two slots.

* * * * *